UNITED STATES PATENT OFFICE.

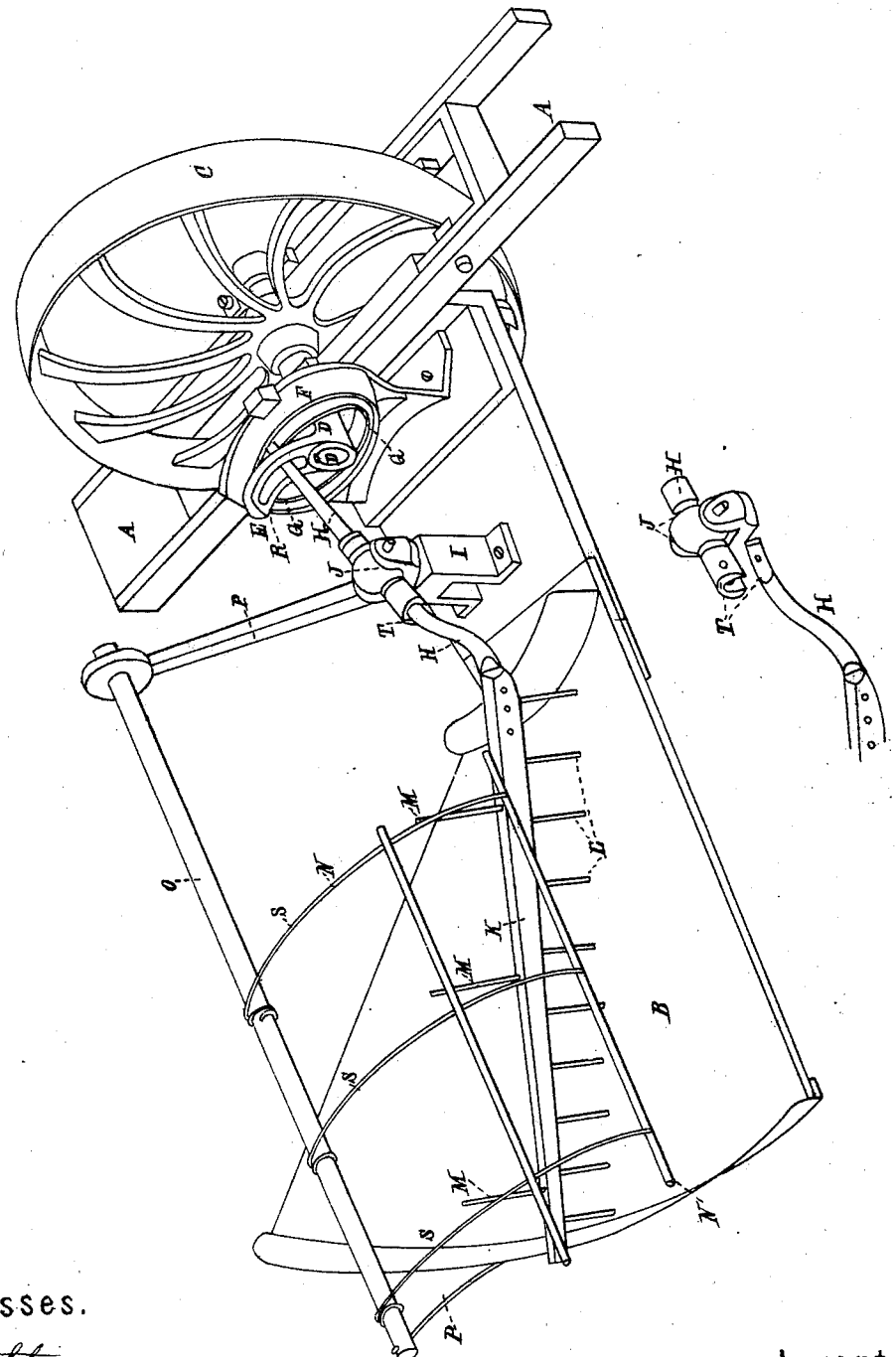

HIRAM H. SCOVILLE, OF SYRACUSE, NEW YORK.

IMPROVEMENT IN HARVESTERS.

Specification forming part of Letters Patent No. 23,613, dated April 12, 1859.

*To all whom it may concern:*

Be it known that I, HIRAM H. SCOVILLE, of the city of Syracuse, in the county of Onondaga and State of New York, have invented a new and useful Improvement in Operating Rakes for Harvesting-Machines; and I do hereby declare the following to be a full, clear, and exact description of the construction and operation of the same, reference being had to the annexed drawings, making part of this specification.

The nature of my invention consists in the method of operating the rake of harvesting-machines by the combined action of a propel-link-crank and stationary cam arranged as hereinafter described; also, in the method of separating the grain on the platform from that which is falling by suspending an apron in front of the rake.

In the drawings, A represents a portion of the frame-work of a reaping-machine.

B is a platform connected with the frame A and sickle-bar, (not shown,) the platform being attached to receive the falling grain, in order that it may be raked for binding.

C is a bearing and driving wheel, which may be connected by gearing or otherwise to the sickle, and having upon its shaft D a slotted and curved crank, E.

F is a stationary cam, made concave on the side toward the rake, and having a groove, G, surrounding the shaft of the wheel C.

H is a crooked lever, to which the head of the rake is attached, and which is connected to the plaftform B by the standard I and universal joint J.

K is the head-bar for the rake, having teeth L projecting downward, and three or more wires or small iron rods, M, projecting upward.

N is the frame-work of the apron, connected to the cross-bar O, which is sustained by the standards P P.

The crank E should be made strongly, of metal, having its slot R sufficiently large to allow the passage of the lever H, and its free movement toward and from the center as the crank revolves. The end of the lever H passes into the groove G, and follows its curve while being carried forward by the revolving of the crank. The peculiar motion given to the end of the lever by the curve in the cam is communicated through the universal joint to the rake, causing it to sweep off the grain from the platform, then be elevated and return to perform the same work again, each movement leaving a bundle on the ground, ready for being bound. The cam may be made of cast-iron, and in any form necessary to communicate the required motion to the rake, the cam serving as a guide, while the crank carries forward the lever. As the grain is cut by the sickle it falls back upon the platform, and as the rake passes forward it carries forward the apron sufficiently to receive the grain, while the rake moves back that which had previously fallen. As the rake moves back the apron follows it and drops the grain, causing a separation, and preventing the grain from falling over the top of the rake.

In the crooked lever H, at some point between the rake-head and the universal joint, make a joint, T, which will allow the head of the rake to be elevated to correspond with the rising and falling of the platform as it passes over uneven ground.

The frame-work N may be covered with cloth to form the apron for the separation of the grain, and so connected with the bar O that each of the wires or rods S S S may act as a spring to press the apron against the rake and cause it to follow its motions with promptness; or it may be connected to the bar O by joints, so as to rest by its weight against the rake instead, the rods acting as springs.

I do not claim the use of a bow or canvas attached to the back of a rake; but

What I claim as my invention, and desire to secure by Letters Patent, is—

1. The arrangement of the propelling-crank E and stationary cam F with respect to the rake-bar and universal joint, when the same are constructed and operated in the manner and for the purpose set forth.

2. Suspending a swinging apron from framework over the platform and in front of the rake, the same being constructed and operating substantially in the manner and for the purpose set forth.

HIRAM H. SCOVILLE.

Witnesses:
R. F. STEVENS,
J. A. SCOVILLE.